United States Patent

Bellows

[15] 3,643,565
[45] Feb. 22, 1972

[54] FOLDING CAMERA WITH DEVELOPING MEANS

[72] Inventor: Alfred H. Bellows, Cambridge, Mass.
[73] Assignee: Polaroid Corporation, Cambridge, Mass.
[22] Filed: Dec. 30, 1970
[21] Appl. No.: 102,775

[52] U.S. Cl. .................................................95/11 R, 95/13
[51] Int. Cl. ...................................G03b 19/02, G03b 17/52
[58] Field of Search...............................................95/11 R, 13

[56] References Cited

UNITED STATES PATENTS 3,283,682  11/1966  Rice...........................................95/13
3,447,437  6/1969   Tiffany.......................................95/13
2,435,717  2/1948   Land..........................................95/13

Primary Examiner—John M. Horan
Assistant Examiner—Kenneth C. Hutchison
Attorney—Brown and Mikulka, Lawrence G. Norris and Alfred E. Corrigan

[57] ABSTRACT

A compact folding camera of the self-developing type including an open ended chamber for receiving a film assemblage. A lens housing section and a processing housing section are mounted in closing relation to the open end of the chamber when the camera is folded. Both are movable, in opposite directions, to expose the open end of the chamber to allow a film assemblage to be inserted into or withdrawn from the chamber through the open end.

7 Claims, 5 Drawing Figures

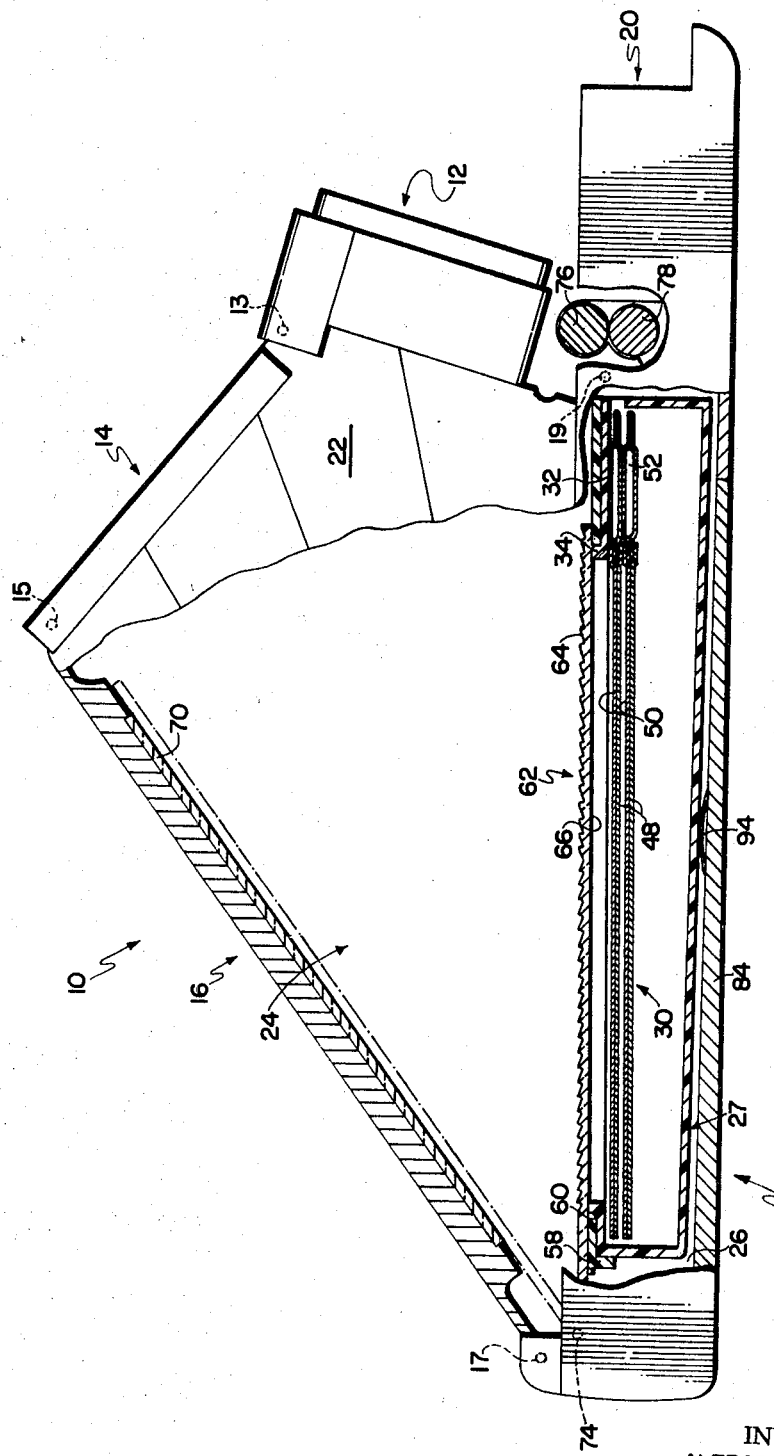

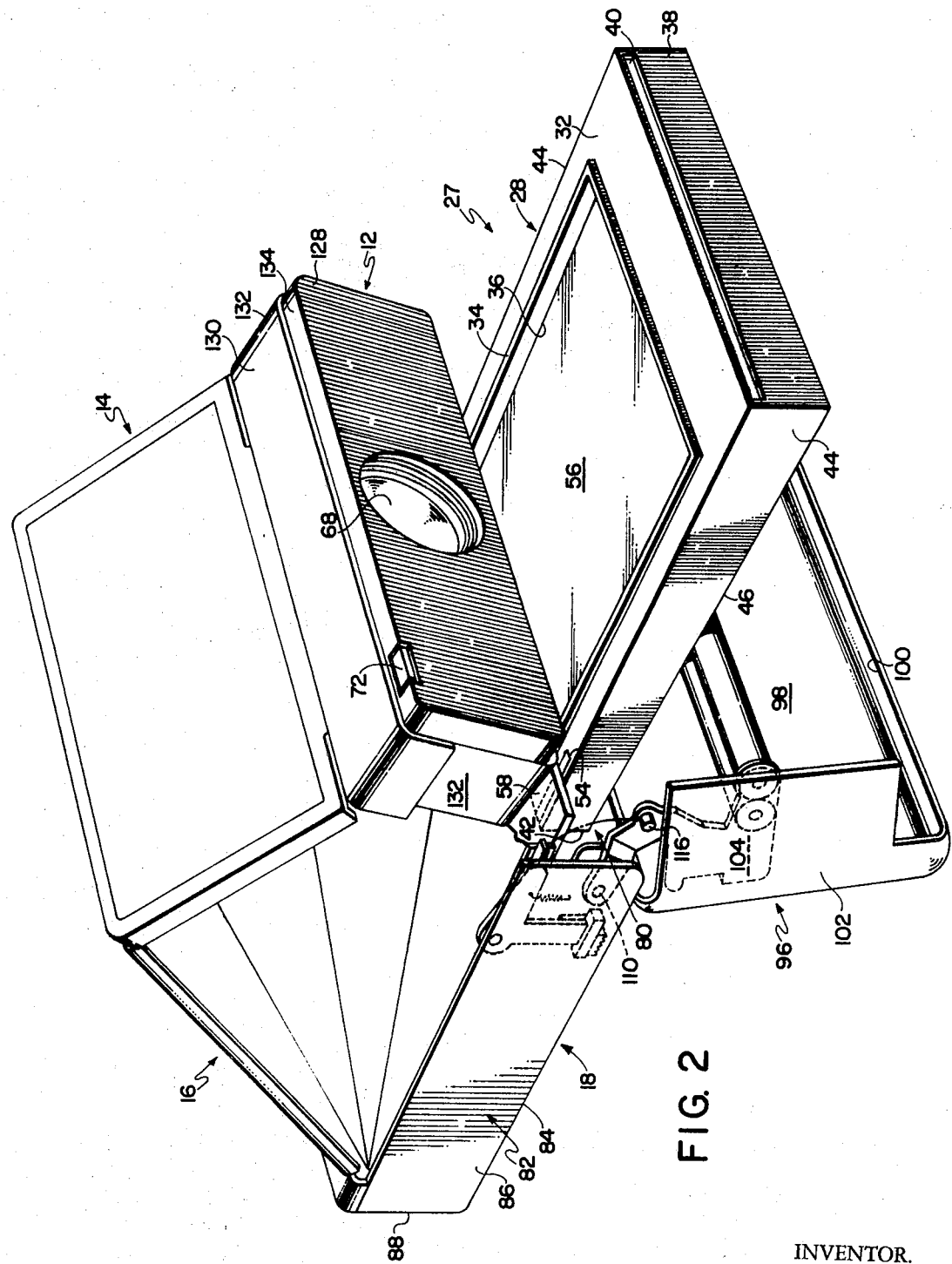

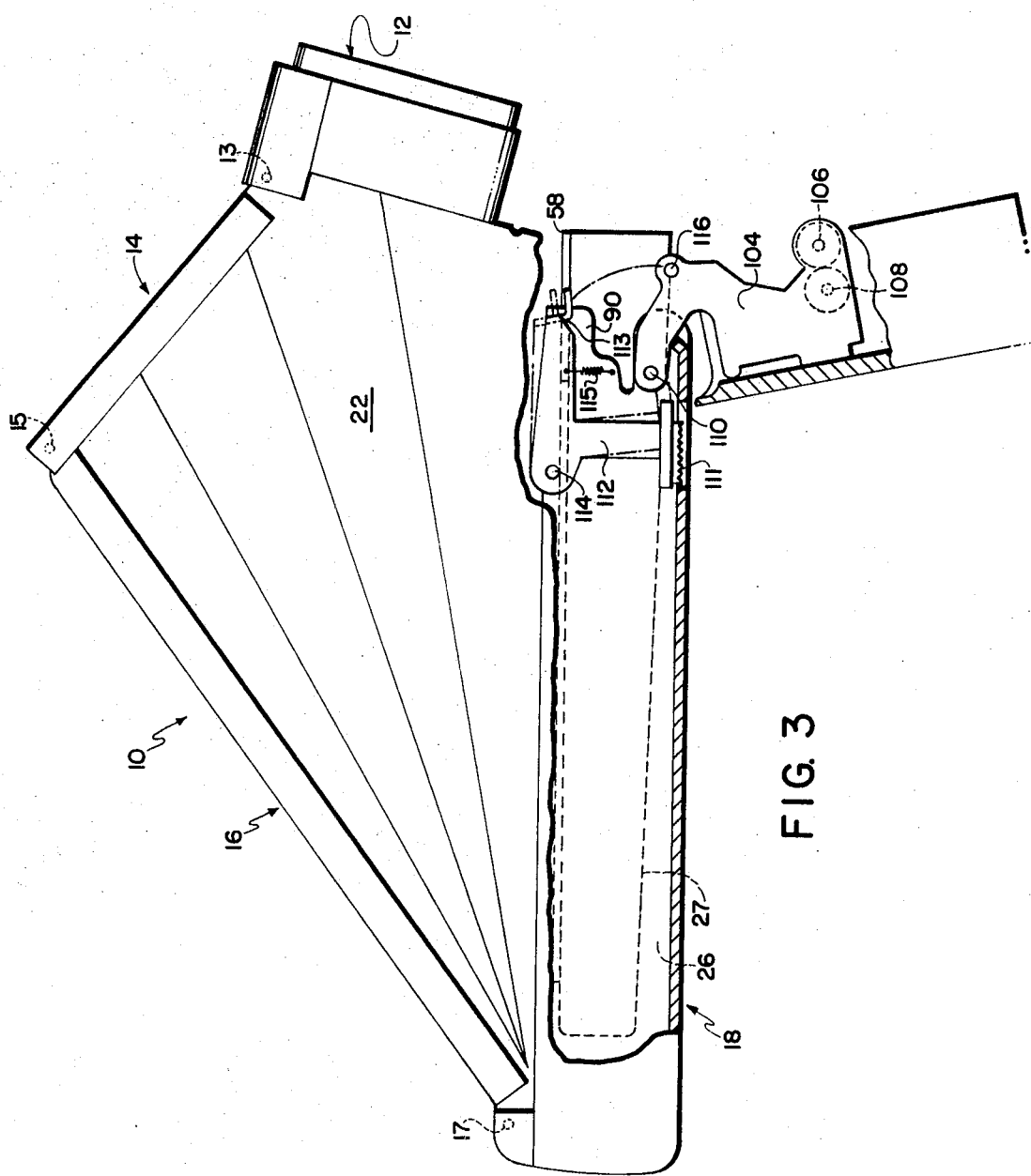

PATENTED FEB 22 1972 3,643,565

INVENTOR.
ALFRED H. BELLOWS

BY

Brown and Mikulka
ATTORNEYS

FOLDING CAMERA WITH DEVELOPING MEANS

BACKGROUND OF THE INVENTION

1. Field of the Invention

This invention relates to the field of folding photographic apparatus of the self-developing type which are adapted to accept a film assemblage.

2. Description of the Prior Art

Cameras of the self-developing type capable of exposing and processing a film unit to produce a full size positive print are well known in the photographic art. These cameras generally include: a chamber for receiving a film assemblage, i.e., a film container preloaded with a plurality of film units in stacked relation; an optical and exposure control system for sequentially exposing the film units; and processing means, usually including a pair of pressure applying members, e.g., rollers, through which an exposed film unit is adapted to be moved to initiate a diffusion transfer process. Certain components of the camera are coupled for movement relative to one another for permitting the camera to assume an extended configuration to establish the relatively long optical paths required to form a full size image at an exposure plane, and a folded configuration for providing a compact structure which encloses components of the optical system to protect them from damage, and is convenient to carry.

The present trend toward smaller and more compact cameras presents the camera designer with formidable task. He must further reduce the overall size of the camera in the folded configuration while incorporating essential components having predetermined dimensions which are beyond his control to alter. For example, the minimum dimensions of the chamber for receiving the film assemblage are determined to a large extent by the size of the film container which is, in turn, controlled by the size and number of individual film units to be packaged within the film container. The size of the film unit's image forming area determines the minimum length of the pressure applying members. And factors, such as field of view, depth of field, degree of optical correction, and maximum aperture establish the minimum overall dimensions of an objective lens, thereby establishing the minimum thickness of a lens housing. The ultimate size of a folded camera will depend on the designer's skill and ingenuity in packaging these essential components.

In addition to reducing the size of the camera, the designer must also provide: means for protecting optical and exposure control components when the camera is not in use; access to the receiving chamber for loading and unloading a film assemblage; and access to the pressure applying members for cleaning and maintenance when necessary.

There are several general design concepts applicable to a compact folding camera having the above-mentioned features. Since the film assemblage receiving chamber is usually the single largest component of the camera when it is in the folded configuration, compactness may be achieved by positioning other components of the camera in end-to-end or side-by-side relation with the receiving chamber. For example, the lens housing should be positioned adjacent an end or side of the receiving chamber rather than being stacked on top of the receiving chamber. Access may be provided to both the receiving chamber and the pressure applying members by employing a chamber having an opening at one end through which a film assemblage may be inserted, and pivotally mounting the pressure applying members for movement between a position adjacent to the open end for engaging an exposed film unit as it leaves the film container and a position sufficiently spaced from the open end and other components of the camera to permit loading of a film assemblage into the chamber through the open end, or cleaning the rollers.

U.S. Pat. No. 3,283,682 discloses a self-developing camera including an open ended chamber for receiving a film container and pivotally mounted pressure applying rollers movable between an operative position adjacent the open end and a loading or cleaning position spaced from the open end. However, the camera disclosed in the above-mentioned patent includes a lens and shutter housing mounted in stacked or overlying relation to the receiving chamber housing, thereby resulting in a rather bulky structure when the camera is in the folded configuration. Furthermore, a separate protective cover is required to cover components of the optical and exposure control system which also increases the overall dimensions of the camera in the folded configuration.

SUMMARY OF THE INVENTION

The present invention provides a self-developing camera of the foldable type which is adapted to accept a film assemblage, including a film container preloaded with a plurality of film units located in stacked relation to each other. The film container includes a light-transmitting section, e.g., an exposure aperture, through which the film units are adapted to be sequentially exposed, and an exit opening, at one end of the container, through which an exposed film unit is adapted to be moved for processing.

The camera includes a first housing section defining a chamber having an opening at one end through which a film assemblage is adapted to be inserted, a second housing section, mounting components of the optical and exposure control system, and a third housing section, including processing means. The second and third housing sections extend forwardly of the first housing section, in closing relation to the open end of the chamber and in nesting relation to each other, to form a compact extension of the first housing section. The second housing section is spaced from the open end of the chamber and the third housing section, which includes a forwardly extending surface mounting a pair of pressure applying rollers, is positioned so that the rollers extend into the space between the open end of the chamber and the second housing section, and the forwardly extending surface is in overlying relation to components of the optical and exposure control system, thereby providing a protective cover for the latter components when the second and third housing sections are in nesting relation to each other.

Means are provided to couple the second and third housing sections to the first housing section for movement, in opposite directions, to expose the open end of the chamber, thereby permitting a film assemblage to be inserted into or withdrawn from the chamber through the open end. Also when the second and third housing sections are positioned to expose the open end, the pressure applying rollers are accessible for cleaning.

The film assemblage has a tapered configuration in cross section, and at least a portion of the receiving chamber has a conforming tapered cross section for insuring selective insertion of the container into the receiving chamber, i.e., to prevent insertion of the assemblage in a backward manner, thereby precluding misalignment of the light-transmitting section of the film container with the image of the subject to be photographed. The camera is adapted for single lens reflex operation and the receiving chamber is formed, in part, by a portion of a reflex member. The chamber is configured and dimensioned to control the angle of insertion of a film container through the open end to a plane substantially parallel with a plane containing the reflex member thereby substantially reducing the possibility of the film container contacting the reflex member and causing damage thereto during insertion.

The camera is adapted to assume a compact parallelepiped shaped configuration when the second and third housing sections are in closing relation to the open end of the chamber and in nesting relation to each other. This is accomplished by employing reentrant surfaces on the optical and exposure control system housing, and providing corresponding mating surfaces on the roller mounting housing.

It is an object of the invention to provide in photographic apparatus of the type including a first housing section, including an open ended chamber for receiving and locating a film assemblage in position for exposure of a photosensitive element contained therein, a second housing section, including components of an exposure control system, and a third housing section, including processing means adapted to engage and move a photosensitive element, subsequent to exposure, toward the exterior of the apparatus, means for mounting the second and third housing sections for movement between a first position, in which they extend forwardly of and in closing relation to the open end of the chamber, and a second position, in which the first and second housing sections are spaced away from each other, to expose the open end of the chamber to permit a film assemblage to be inserted into or withdrawn from the chamber through the open end.

Another object of the invention is to provide in photographic apparatus of the foregoing type, means associated with the third housing section adapted to overlie a portion of the exposure control system of the second housing section when the second and third housing sections are in the first position.

A further object of the present invention is to provide photographic apparatus of the aforementioned type in which the processing means are accessible for cleaning when the above-mentioned second and third housing sections are positioned to expose the open end of the chamber.

Other objects of the invention will in part be obvious and will in part appear hereinafter.

The invention accordingly comprises the apparatus possessing the construction, combination of elements, and arrangement of parts which are exemplified in the following disclosure and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 1 is an elevational view, partly in section, of a camera embodying the instant invention shown in an extended or operative configuration, and illustrating the relative positions of components of the camera's optical system to a film unit located in position for exposure;

FIG. 2 is a perspective view of the camera of FIG. 1, shown in a loading configuration, and a film assemblage which the camera is adapted to accept;

FIG. 3 is an elevational view, partly in section, of the camera in the loading configuration, illustrating the interior construction of a portion of the camera;

DESCRIPTION OF THE PREFERRED EMBODIMENT

Figure 5:
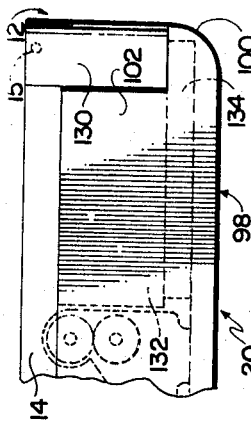
FIG. 5 is a fragmentary elevational view of the camera showing certain of its components in a folded configuration.

Referring now to FIGS. 1 and 2 of the drawings, a foldable, single lens reflex camera of the self-developing type is shown generally at 10 in its operative or extended configuration. The camera 10 includes a plurality of housing sections 12, 14, 16, 18 and 20 which cooperate with bellows 22 (only one side of which is shown) to form an exposure chamber 24. Housing sections 12, 14, 16 and 18 are pivotally coupled to each other by hinge means 13, 15, 17 and 19 for movement between the extended position shown in FIG. 1 and the compact folded position shown in FIG. 5. Housing section 20 is pivotally coupled to housing section 18 about a pivot 110 (see FIG. 2) for movement between the extended position shown in FIG. 1 and the position shown in FIG. 2. Housing section 18 includes a chamber 26 having a tapered configuration for receiving a film assemblage 27 including a film container 28 having a complementary tapered configuration, preloaded with a plurality of film units 30 located in stacked relation.

Film container 28, as best shown in FIG. 2, includes a forward wall 32, having an integrally formed upstanding rib 34 which defines a generally rectangular aperture 36 through which light is admitted to expose the forwardmost film unit contained therein. Film container 28 further includes a leading end wall 38, having an elongated rectangular exit opening 40 through which a film unit is adapted to be moved, a trailing end wall 42, and sidewalls 44, all depending from forward wall 32, and a rear wall 46 joining the end and sidewalls.

Each of the individual film units 30 includes a photosensitive element 48, a superposed transparent image-receiving element 50, and a pod 52 containing processing fluid, joined to elements 48 and 50 at one end. Pod 52 is adapted to rupture upon the application of compressive pressure, thereby releasing the processing fluid which is then uniformly spread between and in contact with elements 48 and 50 to initiate the development of the film unit 30 by a diffusion transfer process. Details as to the construction of film units 30 may be found in U.S. Pat. No. 3,415,644, granted on Dec. 10, 1968, to E. H. Land, and assigned to the same assignee as the instant application.

The film units 30 are preloaded into film container 28 in stacked relation and are spring biased, by means not shown, toward the forward wall 32. The forwardmost film unit 30 is adapted to be exposed through exposure aperture 36 and then removed from the film container through exit opening 40 for processing. A rectangular slot 54, in forward wall 32, which extends to and part way down the trailing end wall 42 of the film container, provides access to the forwardmost film unit for removing it from the film container. An opaque sheet 56, covering apertures 36, 40 and 54, is initially provided within the film container to prevent exposure of the film units prior to insertion of the film assemblage into the camera and is removable in the same manner as the forwardmost film unit once the film container is loaded into receiving chamber 26. It will be noted that the film container is thicker at the leading end than at the trailing end to accommodate the additional thickness of pods 52, thus, providing film container 28 with a tapered longitudinal cross section which diminishes in size from the leading end to the trailing end.

Film container 28 is supported at its forward wall 32 by a platelike support frame 58 having a rectangular aperture 60 through which the upstanding rib 34 is adapted to be inserted in telescoping fashion to locate the forwardmost film unit in position for exposure. Additional support is provided by other components forming receiving chamber 26, as will be described in detail hereinafter.

Camera 10, being of the single lens reflex variety, is adapted to operate first in a viewing and focusing mode, and then in an exposure mode. A platelike reflex member 62, shown in solid lines in FIG. 1 in its viewing and focusing position, atop support member 58 and upstanding rib 34 and covering apertures 36 and 60, forms a lighttight barrier between exposure chamber 24 and receiving chamber 26, and includes an eschelon-type mirror 64 on one side and a planar mirror 66 on the opposite side.

In the viewing and focusing mode of operation, light rays reflected from the scene to be photographed pass through an objective lens 68, mounted in housing section 12, and travel across exposure chamber 24 until they impinge upon a planar mirror 70, fixedly mounted on an interior wall of housing section 16, and are then reflected toward eschelon-type mirror 64 where they form an image of the scene to be photographed. From mirror 64 the light rays are redirected toward a suitable viewfinder (not shown) mounted on housing section 14. The operator views the image at mirror 64, through the viewfinder, while adjusting objective lens 68 until the image is in sharp focus, and then actuates a shutter release button 72 mounted on housing section 12. Upon actuation of button 72, shutter means, not shown, block the passage of light into chamber 24 through lens 68 and the viewfinder. Once chamber 24 is in a lighttight condition, reflex member 62, which is adapted to pivot about an axis 74, is moved from the viewing and focusing position, shown in solid lines in FIG. 1, to an exposure position parallel with and closely adjacent to fixed mirror 70, as shown in phantom lines, with the planar mirror 66 facing toward objective lens 68. The shutter means in housing section 12 are then moved to an unblocking position, permitting light rays to strike mirror 66 from where they are reflected through exposure aperture 36 to expose the forwardmost film unit 30. After an appropriate exposure interval, the shutter means are again moved to a blocking position and reflex member 62 is returned to the viewing and focusing position. At this time suitable means, positionable through aperture 54, engage the exposed forwardmost film unit and advance it through exit opening 40 into the bite of a pair of pressure-applying rollers 76 and 78.

At least one of the pressure-applying rollers is adapted to be rotatably driven in a direction to advance the exposed film unit between the rollers while applying compressive pressure to rupture pod 52, causing the release of the processing fluid which is then uniformly spread between and in contact with elements 48 and 50 to initiate the diffusion transfer process, as film unit 30 is advanced to the exterior of camera 10.

Figure 4:
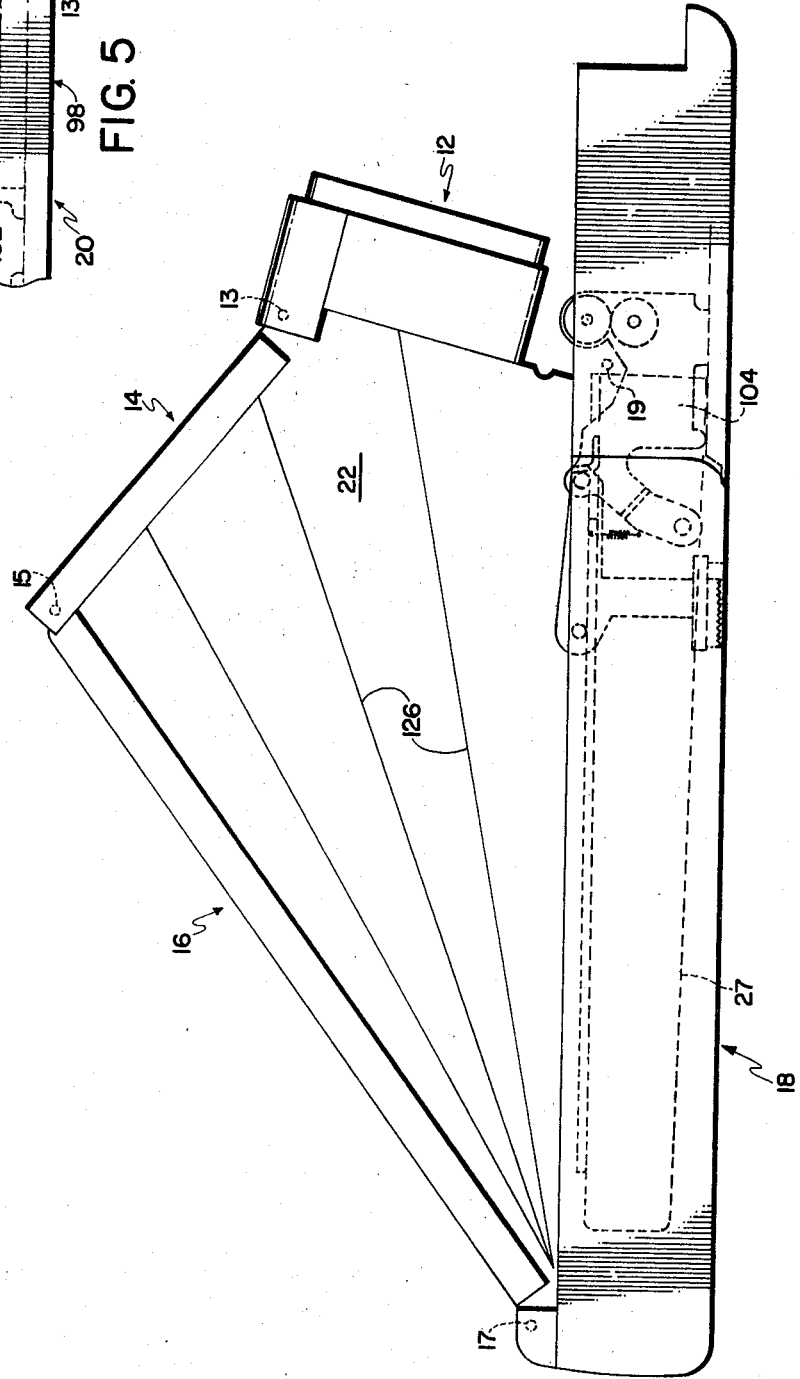
FIG. 4 is an elevational view of the camera, in an operative configuration, showing the relative positions of components in dotted lines.

Access to receiving chamber 26, for inserting or withdrawing a film assemblage, is provided by moving housing section 20 from an operative position, as shown in FIGS. 1 and 4, to a loading position, as shown in FIGS. 2 and 3, to expose open end 80 of the receiving chamber 26 through which film container 28 may be inserted.

Receiving chamber 26 is formed within housing section 18 by the following component parts; a generally U-shaped exterior cover 82 having a tapered bottom wall 84, side walls 86, a trailing end wall 88, and an open leading end at 80; a pair of thin elongated chamber walls 90, mounted parallel with, but spaced from, the interior surface of sidewalls 86, and extending from trailing end wall 88 to a point beyond the leading end of cover 82 as best shown in FIG. 3; a platelike support frame 58, mounted between chamber walls 90, spaced from bottom wall 84, and extending from a point near end wall 88 to a point beyond the leading end of chamber walls 90, having a rectangular aperture 60 therein, dimensioned to be slightly larger than the outer peripheral dimensions of upstanding rib 34 on film container 28 which is adapted to fit within aperture 60 in telescoping fashion to repeatably and accurately locate a film container within the receiving chamber; planar mirror surface 66 of reflex member 62 in its viewing and focusing position resting atop support member 58 and covering aperture 60 in a lighttight manner; and support spring 94 (see FIG. 1), which may be integrally formed in tapered bottom wall 84 or may be separately attached as shown in FIG. 1. All of the components defining receiving chamber 26 are dimensioned and configured to conform closely to the exterior surface of film container 28 when it is fully inserted into the receiving chamber.

To load film container 28 into the receiving chamber, it is inserted trailing end first through the open end at 80 and is moved rearwardly toward the trailing end of housing section 18 with the interior surfaces of chamber walls 90, support frame 58, and tapered bottom wall 84, acting as guides, thereby restricting the angle of insertion to prevent contact between the film container and the mirror surface 66 on the underside of reflex member 62. The film container is moved rearwardly until upstanding rib 34 snaps into place inside of aperture 60 in telescoping fashion under the influence of support spring 94 bearing against the rear wall 46 of the film container.

It will be noted that film container 28 may not be fully inserted into chamber 26 when the thicker leading end is inserted through the opening first, since there is insufficient clearance between the support frame 58 and the tapered bottom wall 84 to allow the passage of the leading end wall 38 therebetween. Thus, the tapered bottom wall 84, in addition to guiding the film container and mounting support spring 94, serves as a means for preselecting the orientation of the film container to insure that exit opening 40 will be positioned adjacent the open end 80 when the film container is fully inserted into the receiving chamber, and that the exposure aperture 36 will be properly located relative to support frame 58.

As best shown in FIG. 3, chamber walls 90 are cut back at the leading end to expose sidewalls 44 of the film container adjacent the leading end wall 38, thereby providing convenient surfaces on the film container to facilitate withdrawal. To remove film container 28 from the receiving chamber, it is grasped at the exposed sides 44 and moved downwardly against the bias of support spring 94 until upstanding rib 34 clears aperture 60 at which point the film container may be withdrawn through the open end.

As previously noted, housing section 20, mounting the pressure applying rollers 76 and 78, is pivotally coupled to housing section 18 for movement between an operative position and a loading position. Housing section 20 includes an exterior cover 96, having a forwardly extending bottom wall 98, a leading end wall 100 and sidewalls 102 depending therefrom. A pair of laterally spaced brackets 104 are mounted on bottom wall 98 for rotatably mounting rollers 76 and 78 at pins 106 and 108 and for pivotally coupling housing section 20 to chamber walls 90 at pin 110, as best shown in FIG. 3.

A spring biased latch member 112 (see FIG. 3) is positioned between chamber wall 90 and cover sidewall 86, and is pivotally coupled to chamber wall 90 at pin 114 for movement between a latching position, as shown in solid lines, and an unlatching position, as shown in phantom lines as best seen in FIG. 3. Latch 112 includes a section 113 which is adapted to engage a latch pin 116, mounted on bracket 104, to releasably retain housing section 20 in operative relation to housing section 18, as best shown in FIG. 4. By moving a button 111, attached to the foot of latching member 112, forwardly, the latch 112 rotates in a counterclockwise direction against the bias of a spring 115 to raise section 113 to a position out of engagement with latch pin 116, thereby permitting housing section 20 to be moved from the operative position, as shown in FIGS. 1 and 4, to the loading position, as shown in FIGS. 2 and 3. It will be noted that when housing section 20 is in the operative position, processing rollers 76 and 78, which are formed as elongated cylinders slightly longer in length than the width of a film unit, are located in position to receive a film unit as it exits from film container 38 via opening 40. Also when housing section 20 is in the operative position, exterior cover 96 is adapted to form a smooth extension of exterior cover 82 of housing section 18. As best shown in FIGS. 2 and 3, it will further be noted that the pressure applying rollers are sufficiently spaced from the open end 80 of the chamber and housing section 12, when housing section 20 is in the loading position, to permit loading and unloading of a film container through the open end, and are also accessible for cleaning.

As noted earlier, camera 10 is adapted to be folded into a compact configuration, i.e., housing sections 12, 14 and 16 are adapted to pivot about axes 13, 15, 17 and 19 permitting housing section 12 to be rotated in a clockwise direction into the forward position of housing section 20, with housing sections 14 and 16 forming a planar outer surface over a portion of housing sections 12 and 18, respectively. As housing sections 12, 14 and 16 are moved from the extended configuration to the folded configuration, the bellows 22 collapses along memory lines 126 and is stored between the upper and lower housing sections.

As best seen in FIG. 2, housing section 12 includes a first section 130 having a recessed portion 132 therein, which extends substantially around three sides of section 130, and a second section 134 of reduced dimensions extending forwardly of first section 130, and including a recessed portion for receiving the shutter release button 72. As best seen in FIG. 5, when camera 10 is in the folded configuration, housing sections 12 and 20 are in nesting relation to each other. The lower portion of cover side wall 102, leading end wall 100, and bottom wall 98 cooperate to form a recessed portion within cover 96 for receiving second section 134, and the upper portion of sidewalls 102 are adapted to be positioned in overlying relation to the recessed portion 132 of section 130, thereby permitting camera 10 to assume a compact parallelepiped shaped configuration. It will be noted that housing section 12 is spaced from the open end 80 of the chamber 26 (see FIG. 5) and that pressure applying rollers 76 and 78 are adapted to extend into the space when the camera is folded. Bottom cover wall 98, in addition to mounting the pressure applying rollers 76 and 78, forms a protective cover over lens 68 to protect the lens from damage, and similarly leading end wall 100 forms a protective cover over shutter release button 72 to prevent actuation of the button while camera 10 is folded.

To erect camera 10 from the folded configuration, housing section 12 is rotated in a counterclockwise direction about hinge means 19 causing housing sections 14 and 16 to pivot about hinge means 13, 15, and 17 until the three housing sections reach the extended position, as shown in FIGS. 1, 2, 3 and 4. An erecting link (not shown) is provided to releasably secure housing sections 12, 14 and 16 in the extended position. Housing section 20 may then be moved to the loading position by actuating latch button 111 to permit housing section 20 to rotate in a clockwise direction about pin 110. It will be noted that housing sections 12 and 20 are rotated in opposite directions to gain access to the open end 80 of chamber 26.

From the foregoing it can be seen that there has been disclosed photographic apparatus of the self-developing type which is adapted to assume a thin, compact, parallelepiped configuration when in a folded condition. The apparatus includes a first housing section having an open ended chamber for receiving a film assemblage and second and third housing sections, including components of the apparatus' exposure system and processing rollers, respectively, extending forwardly of the open end of the chamber. The second and third housing sections are coupled to the first section for movement between the compact, folded position in which the third housing section protects the exposure components against accidental operation or damage, and a second position in which the second and third housing sections are spaced away from each other to expose the open end of the chamber to permit the film assemblage to be withdrawn from or inserted into the chamber and/or cleaning of the processing rollers.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus comprising:

a first housing section including means defining a chamber for receiving a film assemblage, said chamber having an open end through which a film assemblage is adapted to be inserted;

a second housing section, including lens means, and a third housing section, including processing means, extending forwardly of said first housing section in closing relation to said open end, said second housing section being spaced from said open end and said processing means being positioned to extend into said space; and means coupling said second and third housing sections to said first housing section for movement in opposite directions to expose said open end thereby permitting a film assemblage to be inserted into or withdrawn from said chamber through said open end.

2. Photographic apparatus as defined in claim 1 wherein said processing means are located in position for cleaning when said second and third housing sections are positioned to expose said open end.

3. Photographic apparatus as defined in claim 1 wherein said chamber has a tapered configuration in cross section substantially conforming to that of a film assemblage for insuring selective insertion of the film assemblage into said chamber.

4. Photographic apparatus as defined in claim 1 further including optical means located in a first plane and forming a portion of said chamber and said chamber is configured and dimensioned to restrict insertion of a film assemblage through said open end to a plane substantially parallel with said first plane thereby substantially reducing the possibility of the film assemblage contacting said optical means during insertion.

5. Photographic apparatus as defined in claim 1 wherein said third housing section includes a recessed portion for receiving said second housing section when said second and third housing sections are in said closing relation to said open end.

6. Photographic apparatus as defined in claim 1 wherein said third housing section further includes a surface located in overlying relation to said lens means to form a protective cover for said lens means when said second and third housing sections are in said closing relation to said open end.

7. Photographic apparatus as defined in claim 6 wherein said second housing section further includes shutter release means and said third housing section includes means for preventing actuation of said shutter release means when said second and third housing sections are in said closing relation to said open end.

* * * * *

UNITED STATES PATENT OFFICE
CERTIFICATE OF CORRECTION

Patent No. 3,643,565            Dated February 22, 1972

Inventor(s) Alfred H. Bellows

It is certified that error appears in the above-identified patent and that said Letters Patent are hereby corrected as shown below:

Column 6, line 56, "position" read as --portion--.

Title Page - Delete electronic circuit diagram and substitute therefor Fig. 2 of the drawings.

Note: The electronic circuit diagram shown on the title page is not part of Patent No. 3,643,565 nor did it appear in the Patentee's application leading to Patent No. 3,643,565.

Signed and sealed this 3rd day of October 1972.

(SEAL)
Attest:

EDWARD M. FLETCHER, JR.
Attesting Officer

ROBERT GOTTSCHALK
Commissioner of Patents